(12) United States Patent
Chey et al.

(10) Patent No.: US 6,928,380 B2
(45) Date of Patent: Aug. 9, 2005

(54) THERMAL MEASUREMENTS OF ELECTRONIC DEVICES DURING OPERATION

(75) Inventors: S. Jay Chey, Ossining, NY (US); Hendrik Hamann, Yorktown Heights, NY (US); James A. Lacey, Mahopac, NY (US); James Vichiconti, Peekskill, NY (US); Robert J. von Gutfeld, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/699,123

(22) Filed: Oct. 30, 2003

(65) Prior Publication Data

US 2005/0114068 A1    May 26, 2005

(51) Int. Cl.[7] .............................. G01K 7/04; G01K 7/16
(52) U.S. Cl. ...................... 702/130; 702/132; 374/141; 165/11.1; 257/717
(58) Field of Search ............................... 702/130, 132; 374/141; 165/11.1; 257/717

(56) References Cited

U.S. PATENT DOCUMENTS

| | | | | |
|---|---|---|---|---|
| 4,899,180 A | * | 2/1990 | Elhatem et al. | 347/59 |
| 4,980,702 A | * | 12/1990 | Kneezel et al. | 347/17 |
| 5,036,337 A | * | 7/1991 | Rezanka | 347/14 |
| 5,075,690 A | * | 12/1991 | Kneezel | 347/17 |
| 5,825,625 A | * | 10/1998 | Esterberg et al. | 361/719 |
| 6,020,820 A | * | 2/2000 | Chiang | 340/584 |
| 6,058,012 A | * | 5/2000 | Cooper et al. | 361/704 |
| 6,092,926 A | * | 7/2000 | Still et al. | 374/141 |
| 6,496,118 B1 | * | 12/2002 | Smith | 340/584 |
| 6,515,285 B1 | * | 2/2003 | Marshall et al. | 250/352 |
| 6,631,638 B2 | * | 10/2003 | James et al. | 73/204.26 |
| 6,787,870 B2 | * | 9/2004 | Wienand et al. | 257/467 |

FOREIGN PATENT DOCUMENTS

WO         WO 3046702 A2 *    6/2003    ............. G06F 1/20

* cited by examiner

Primary Examiner—Bryan Bui
Assistant Examiner—Anthony T. Dougherty
(74) Attorney, Agent, or Firm—Jon A. Gibbons; Fleit, Kain, Gibbons, Gutman, Bongini & Bianco P.L.

(57) ABSTRACT

A system and method for measuring thermal distributions of an electronic device during operation is disclosed. The system includes an electronic device, a heat sink adjacent to the electronic device and an electrical-insulating layer disposed on the electronic device so as to separate the electronic device and the heat sink. The system further includes a plurality of thermal sensors located on the electrical-insulating layer, each of the plurality of thermal sensors in a different location. The plurality of thermal sensors is located within one or more thin film circuit layers disposed adjacent to the electrical insulating layer. The system further includes a module for receiving thermal information from the plurality of thermal sensors during operation of the electronic device. The system further includes a processor coupled to the module for generating a thermal distribution of the electronic device based on the thermal information received from the plurality of thermal sensors.

21 Claims, 7 Drawing Sheets

THERMAL MEASUREMENTS OF ELECTRONIC DEVICES DURING OPERATION

CROSS-REFERENCED APPLICATIONS

This non-provisional application is related to the following two non-provisional applications: (1) U.S. patent application Ser. No. 10/699,399, entitled "TRANSPARENT COOLING DUCT" filed on even date herewith, and (2) U.S. patent application Ser. No. 10/699,122, entitled "COOLING OF SURFACE TEMPERATURE OF A DEVICE", filed on even date herewith, which are hereby commonly assigned to International Business Machines Corporation and which are each hereby separately incorporated by reference in their entirety.

PARTIAL WAIVER OF COPYRIGHT

All of the material in this patent application is subject to copyright protection under the copyright laws of the United States and of other countries. As of the first effective filing date of the present application, this material is protected as unpublished material. However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

FIELD OF THE INVENTION

This invention generally relates to the field of microprocessors and more specifically to thermal measurements of microprocessors.

DESCRIPTION OF RELATED ART

Recently, there has been a strong effort to design microprocessor-cooling apparati, such as blowers, cooling 'hats', micro-channels and ducts, for limiting the temperature, which microprocessors attain under, rated electrical loading or operating conditions. The cooling problem has become quite severe due to increased circuit density within contemporary microprocessors and the accompanying leakage currents that result. As a further complication, the heat load on a microprocessor, which depends on the workload of the microprocessor, is unevenly distributed over the area of the microprocessor die. Thus, a need has arisen to design means for determining the thermal distributions over the area of a microprocessor as the microprocessor receives different operating instructions.

Without detailed thermal knowledge of a microprocessor during operation, it is impossible to guarantee that the microprocessor will withstand the temperatures to which it will be subjected in the normal course of operation. Thus, detailed thermal information of a microprocessor during operation is needed for the successful design of microprocessors and their cooling elements. In addition, such thermal information can be used for on-line monitoring of microprocessor and package temperatures to ensure that the microprocessor is operated under reasonable conditions. To date, there is no known technique for measuring the thermal distribution of a fully operational microprocessors with heat flux densities of larger than approximately 10 W/cm$^2$. One reason for this lack of techniques is due to the fact that cooling systems themselves often prevent access for thermal measurements of a microprocessor. For example, infrared-imaging techniques are typically not possible because the heat sink is non transparent. There are a number of modeling efforts to determine such temperatures theoretically but these tend to be of limited value to microprocessor designers.

The use of coolant-filled ducts, for example, provides an obstacle to infrared-imaging techniques as the ducts and the coolant block temperature information from reaching an infrared-sensor. Because the ducts and/or the coolant absorb at least some of the energy radiated from the microprocessor, the infrared sensor cannot take an adequate temperature reading of the microprocessor. Thus, such cooling systems do not allow for the taking of proper thermal measurements of the microprocessor.

Therefore a need exists to overcome the problems with the prior art as discussed above, and particularly for a way to more efficiently measure the thermal properties of a microprocessor during operation.

SUMMARY INVENTION

Briefly, in accordance with the present invention, disclosed is a system and method for measuring the thermal distributions of a microprocessor during operation. In an embodiment of the present invention, the system includes a microprocessor, a heat sink adjacent to the microprocessor and an electrical-insulating layer disposed preferably on the heat sink so as to isolate the sensing circuitry and the heat sink. The system further includes a plurality of thermal sensors located adjacent to the electrical-insulating layer, each of the plurality of thermal sensors in a different location. The plurality of thermal sensors is located within one or more thin film circuit layers disposed between the heat sink and the electronic device. The system further includes a module for receiving thermal information from the plurality of thermal sensors during operation of the microprocessor. In one embodiment of the present invention, the system further includes a processor coupled to the module for generating a thermal distribution of the microprocessor based on the thermal information received from the plurality of thermal sensors.

In an embodiment of the present invention, the method for measuring the thermal distribution of a microprocessor during operation includes sensing, by a plurality of thermal sensors, thermal distributions of a microprocessor during operation of the microprocessor, the plurality of thermal sensors located on an electrically-insulating layer, each of the plurality of thermal sensors in a different location, wherein the insulating layer is disposed preferably on the heat sink so as to isolate the sensing circuitry. The method further includes receiving, by a module, thermal information from the plurality of thermal sensors. In another embodiment of the present invention, the method further includes generating a thermal distribution of the microprocessor based on the thermal information received from the plurality of thermal sensors.

In yet another embodiment of the present invention, also disclosed are a system and method for measuring the thermal distribution of a microprocessor during operation. In an embodiment of the present invention, the system includes a microprocessor, a duct adjacent to the microprocessor and a coolant that flows through the duct so as to cool the microprocessor. The duct and the coolant are transparent or semi-transparent to the photons. The system further includes a photon detector such as an infrared camera, located adjacent to the duct, for capturing thermal information from the microprocessor during operation of the microprocessor. The system further includes a module for receiving thermal information from the photon detector. In an embodiment of the present invention, the system further includes a processor coupled to the module for generating a thermal distribution of the microprocessor based on the thermal information received from the photon detector.

The foregoing and other features and advantages of the present invention will be apparent from the following more particular description of the preferred embodiments of the invention, as illustrated in the accompanying drawings.

BRIEF DESCRIPTION OF THE DRAWINGS

The subject matter, which is regarded as the invention, is particularly pointed out and distinctly claimed in the claims at the conclusion of the specification. The foregoing and other features and also the advantages of the invention will be apparent from the following detailed description taken in conjunction with the accompanying drawings.

DETAILED DESCRIPTION OF THE PREFERRED EMBODIMENTS

Figure 1A:
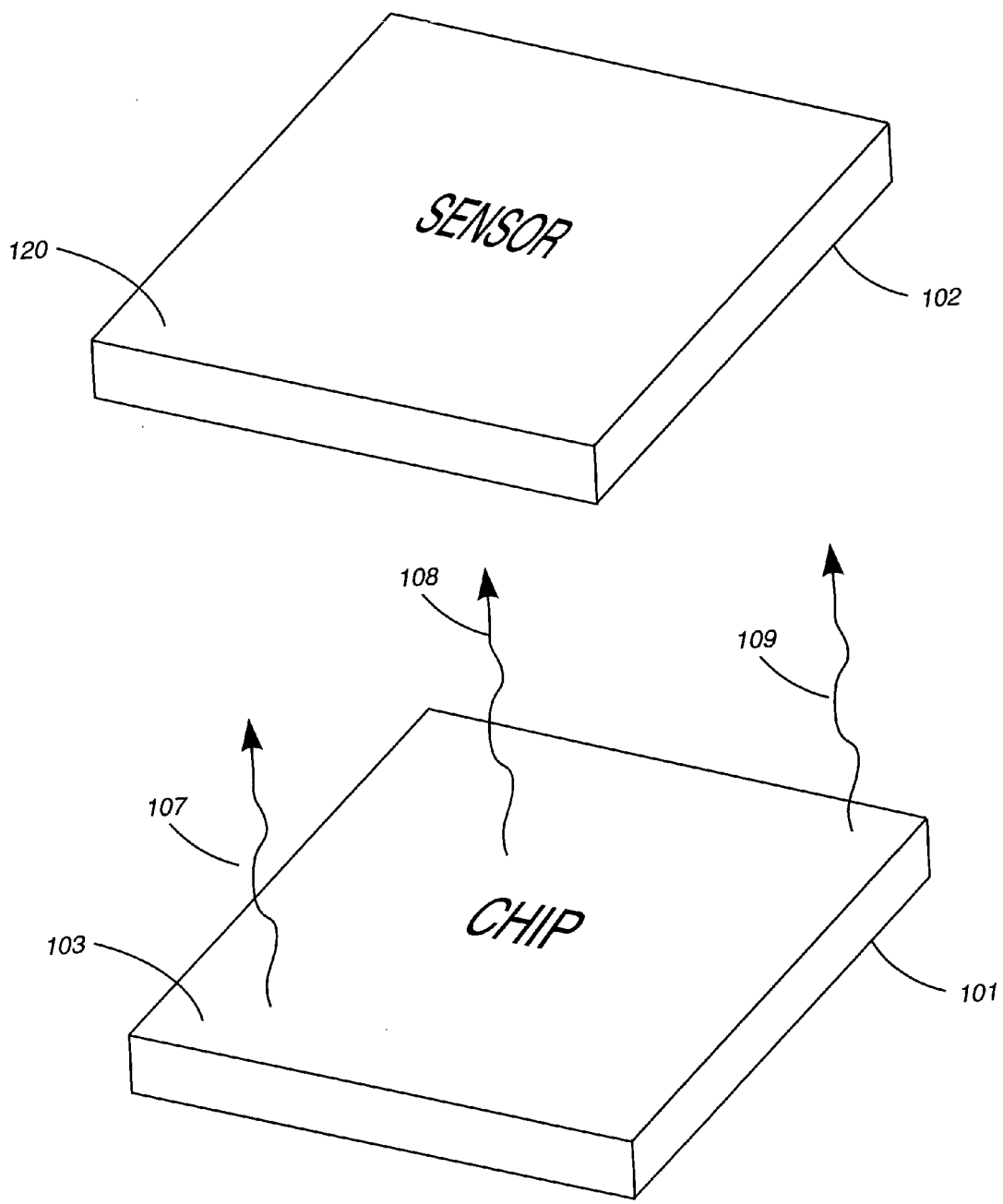
FIG. 1A is a block diagram illustrating the overall system of one embodiment of the present invention.

It should be understood that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality. In the drawing like numerals refer to like parts through several views.

The present invention, according to a preferred embodiment, overcomes problems with the prior art by providing an efficient and easy-to-implement system and method for measuring the thermal distributions of a microprocessor during operation.

Overview

In order to ascertain the thermal distributions of a microprocessor under operating conditions, several embodiments are disclosed to determine the microprocessor thermal properties as a function of position on the microprocessor. Certain embodiments utilize a cooling fixture, such as a copper block, and thermal sensors making thermal contact with the microprocessor or a thermal interposer. Another embodiment utilizes an optical technique to view a fully operational microprocessor. For example, an infrared camera records the thermal distributions of the microprocessor by viewing the microprocessor black body radiation emitted due to the heat that is created during operation. The thermal distributions generated from any one of the embodiments outlined above can be used to make adjustments to the design or the operation of the microprocessor. Another useful application of the measurement technique makes it possible to redesign the cooling structure where necessary.

In an embodiment of the present invention, a plurality of thermal sensors used to take for example temperature measurements of the electronic device are located within one or more thin film circuit layers disposed between a heat sink and the electronic device. In this embodiment, the location of the circuit layer and the thermal sensors, between a heat sink and the electronic device, allows the thermal sensors to gather for example temperature readings that include the effect of the heat sink upon the electronic device. Further, the location of the circuit layer and the thermal sensors allows the temperature sensors to gather for example temperature readings from the electronic device during operation, wherein the electronic device is operating under conditions for which the electronic device is designed.

FIG. 1A is a block diagram illustrating the overall system of one embodiment of the present invention. FIG. 1A shows electronic device 101, having a top surface 103, and thermal sensor 102. FIG. 1A also shows heat emanating from the top surface 103 of electronic device 101. Heat emanations are shown as arrows 107, 108 and 109. Note that heat 107, 108 and 109 originates from different locations on the top surface 103 of electronic device 101.

The function of thermal sensor 102 in this embodiment is to capture temperature information of the top surface 103 of the electronic device 101 during operation of electronic device 101. More specifically, thermal sensor 102 captures temperature information of the top surface 103 of the electronic device 101 as a function of position. Thus, the thermal sensor 102 captures and records temperature information and position information for each temperature reading. For example, temperature sensor 102 would capture and record temperature information and position information for each heat emanation 107, 108 and 109. This allows the generation of a temperature profile of the top surface 103 of the electronic device 101.

Mathematically, a temperature distribution can be described as a set of ordered pairs 1 through n, wherein each pair includes a temperature value and a position value. This is shown in the equation below:

Temp distribution=(position$_1$, temperature$_1$), (position$_2$, temperature$_2$), . . . , (position$_n$, temperature$_n$)

Figure 1B:
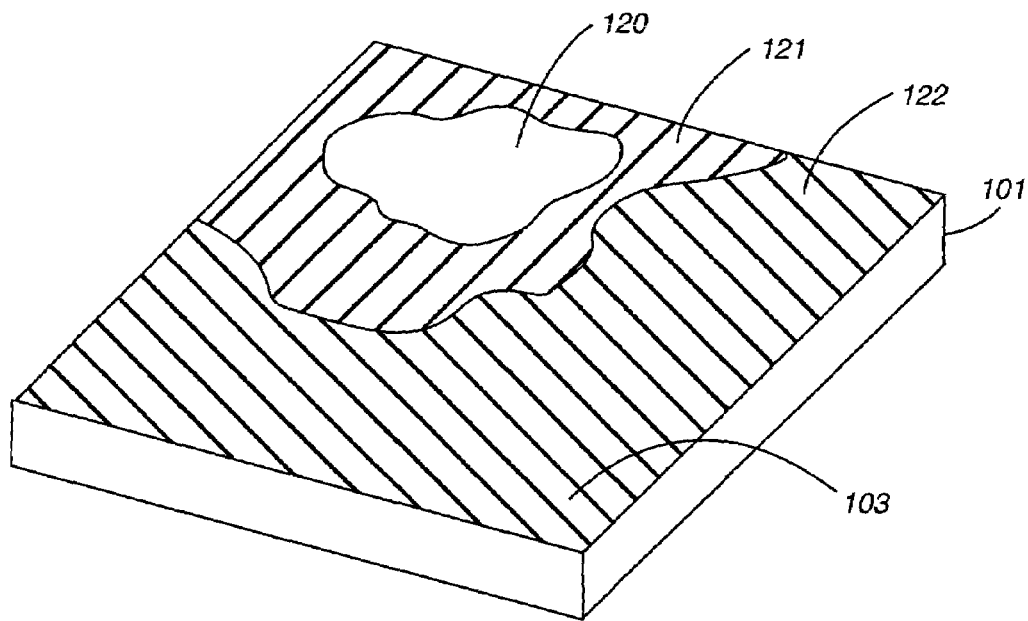
FIG. 1B is a graphical representation of a thermal distribution generated by one embodiment of the present invention.

FIG. 1B is a graphical representation of a temperature distribution generated by one embodiment of the present invention. FIG. 1B shows how the temperature distribution described above can be represented graphically to show temperature distributions on the top surface 103 of the electronic device 101. In FIG. 1B, the top surface 103 of the electronic device 101 is divided into three different shaded areas 120, 121 and 122. Each shaded area 120, 121 and 122 refers to a temperature interval. For example, shaded area 120 may refer to a temperature interval of about 50–75 degrees Centigrade, shaded area 121 may refer to a temperature interval of about 25–50 degrees Centigrade and shaded area 122 may refer to a temperature interval of about 10–25 degrees Centigrade. In this way, the graphical representation of FIG. 1B, based on a temperature profile, shows the locations of different temperatures on the top surface 103 of the electronic device 101.

As described above, shaded area 120 may refer to a temperature interval of about 50–75 degrees Centigrade—the highest temperature interval present on the top surface 103 of the electronic device 101. Thus, in relation to the other temperatures on the top surface 103 of the electronic device 101, area 120 represents a hot spot. One advantage of the present invention is that hot spots on microprocessors are identified under operating conditions. It is important to realize that the thermal distributions depend on the thermal properties of the package. Since this invention measures the thermal distribution in situ in the package, it most realisitically yields the thermal information needed to improve, for example, cooling fixtures etc. This information can be used to modify the design of the electronic device 101 or its cooling elements to render the system more efficient.

In one embodiment of the present invention, the temperature information and position information captured and recorded by thermal sensor 102, i.e., the thermal distribution, would be associated with information pertaining to the operation of the electronic device 101, such as the current load or the current operating processes or conditions of the electronic device 101, i.e., a load profile. For example, each thermal distribution would be associated with a set of processes currently running on the electronic device 101, resulting in a load-based temperature profile. The thermal distributions can be also associated with a set of thermal load conditions. For example, the thermal distribution can be associated with different heat removal rates, which are realized by the package. Mathematically, a load based temperature profile can be described as an ordered pair consisting of a temperature profile and a load profile. This is shown in the equation below:

Load-based Temp profile=(Temp profile, Load profile)

One advantage of the present invention is that thermal profiles are gathered while the electronic device 101 is operating, hence, and "in situ" thermal measurement. These load-based thermal distributions allow the electronic device 101 to be measured while it is operating under normal operating conditions, i.e., the operating conditions for which the electronic device 101 was built. This is an advantage over the prior art, which does not disclose the adequate gathering of thermal measurements in situ. As described in the Background section above, there is no known technique for measuring the surface temperature distribution of a fully operational microprocessor with heat flux densities of larger than approximately 10 W/cm². One reason for this lack of techniques is due to the fact that cooling systems themselves often prevent access for thermal measurements of a microprocessor. For example, infrared-imaging techniques are typically not possible because the heat sink is non transparent.

Figure 2:
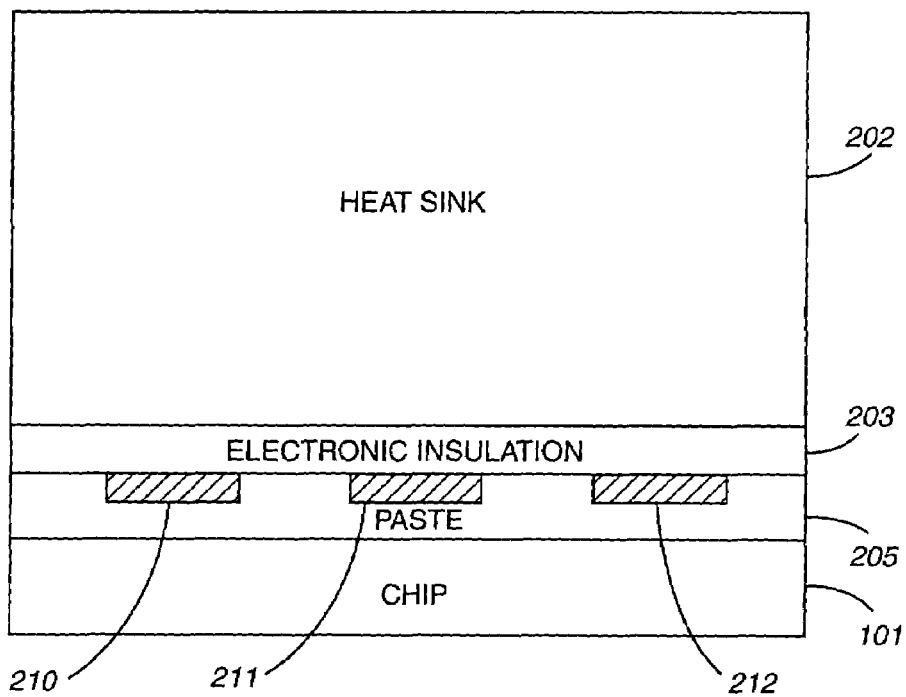
FIG. 2 is a cross sectional diagram depicting one embodiment of the present invention.

FIG. 2 is a cross sectional diagram depicting one embodiment of the present invention. FIG. 2 shows a cross section of the system of an electronic device package including a heat sink and thermal sensors. FIG. 2 shows a heat sink 202 manufactured of copper or silicon, for example, or another heat conductive material. In FIG. 2 the thermal sensors are 210, 211, 212, which are part of the larger circuitry. Typically, photolithography can be used to produce the thermal sensors 210, 211, 212 in the circuitry. The thickness of the circuitry and thermal sensors 210, 211, 212, which may comprise several layers, may be between 10 nm and several microns. The thickness of the circuitry/sensors is chosen so that the thermal distribution of the electronic device is not influenced. It is important to realize that because of the thermal nature of the heat sink 202 (i.e., high thermal conductivity and low thermal resistance) and the proximity of the thermal sensors to the heat sink 202, the thermal impedance of the thermal sensors 210, 211 and 212 is governed by the heat sink 202. Consequently, the thermal distribution measured by the thermal sensors can be converted by knowing the total dissipated power in the electronic device to heat flux distributions. Generally, the thermal sensors can be any kind of thermal sensors including thermocouple sensors or thin film resistor sensors, are described in more detail below.

An electrical-insulating layer 203 insulates the circuitry with the sensors from the heat sink 202 so as to isolate the circuitry from the heat sink, which is typically copper. Layer 203 is, for example, a thin layer of silicon dioxide (of <1 micron thickness), which is thin enough not to disturb the heat flow pattern of the electronic device package. Layer 203 may also comprise a thin film of silicon nitride, intrinsic silicon, amorphous silicon or alumina.

FIG. 2 also shows a layer of thermal paste or grease 205 that separates the thermal sensors 210, 211 and 212 with the circuitry from the electronic device 101. The configuration described in FIG. 2 allows the thermal sensors 210, 211 and 212 to measure the temperature distribution on the heat sink 202. These measurements include the effect of the thermal paste 205 on the temperature distribution. Such measurements can be very useful to diagnose failures of the paste 205.

Thermocouple Temperature Sensor Embodiment

Figure 3:
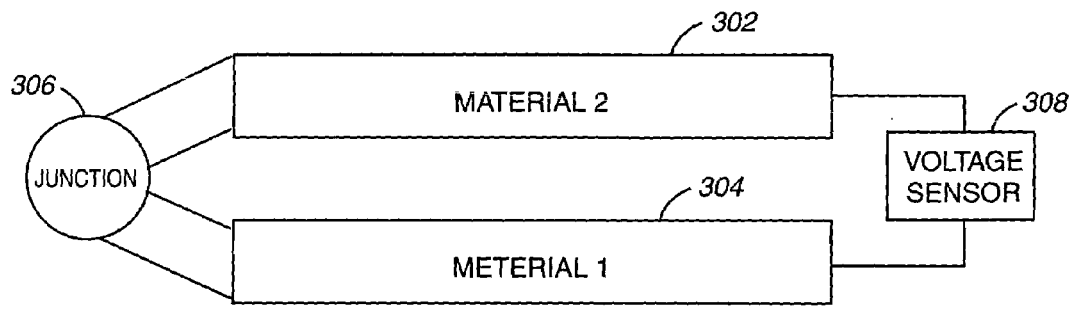
FIG. 3 is an illustration of a conventional thermocouple temperature sensor used in one embodiment of the present invention.

FIG. 3 is an illustration of a conventional thermocouple thermal sensor used in one embodiment of the present invention. The thermocouple of FIG. 3 is one embodiment of a temperature sensor 210, 211 and 212 that may be used in the electronic device package of FIG. 2. FIG. 3 shows two materials 302 and 304 adjacent to each other and connected to a junction 306. FIG. 3 also shows a voltage sensor 308 coupled to the junction 306.

The Seebeck effect dictates that the junction between two materials generates a voltage, which is a function of temperature. Thermocouples rely on this Seebeck effect. In order to elicit a temperature reading, the voltage sensor 308 takes a reading of the voltage at the junction 306. Although almost any two types of materials can be used to make a thermocouple, a number of standard types are used because they possess predictable output voltages for given temperatures.

Standard tables show the voltage produced by thermocouples at any given temperature. Unfortunately it is not possible to simply connect up a voltmeter to the thermocouple to measure this voltage, because the connection of the voltmeter leads will make a second, undesired thermocouple junction. To make accurate measurements, this must be compensated for by using a technique known as cold junction compensation (CJC). It is acceptable to make a thermocouple junction by soldering the two materials together as the solder will not affect the reading. In practice, however, thermocouple junctions are made by welding the two materials together (usually by capacitive discharge) as this ensures that the performance is not limited by the melting point of solder.

Figure 4:
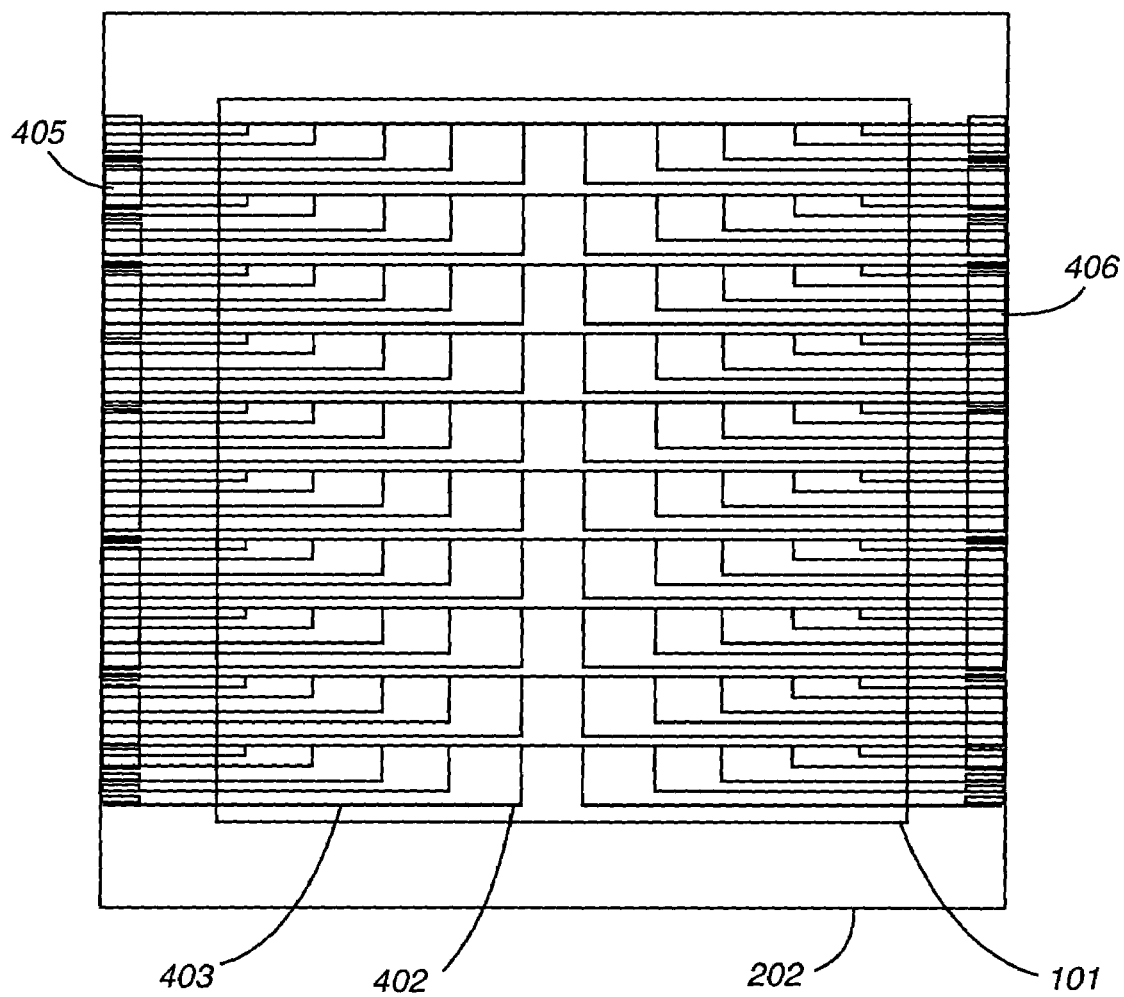
FIG. 4 is an illustration showing the distribution of thermocouple temperature sensors in an electronic device package, in one embodiment of the present invention.

FIG. 4 is an illustration showing the distribution of thermocouple thermal sensors in an electronic device package, in one embodiment of the present invention. FIG. 4 is a view from the bottom, looking up onto the heat sink of FIG. 2. FIG. 4 shows the outline of the heat sink 202 and the outline of the electronic device 101. FIG. 4 shows an array of closely spaced thermocouples (such as the thermocouple of FIG. 3), which are congruent with the top surface 103 of the electronic device 101. The thermocouples are directly patterned on the electrical insulating layer, which is directly formed on the heat sink. FIG. 3 shows one (of many) thermocouple 402 near the bottom left hand side of the figures.

In one embodiment of the present invention, in an area of approximately 2×2 cm the array of temperature sensors will consist of about 100 evenly spaced thermocouples with junction areas on the order of about 10,000 microns$^2$. The thermocouple circuit lines (such as thermocouple circuit line 403 for thermocouple 402) are on the order of about 1–20 microns in width. Leads from the thermocouples are directed toward a surrounding circuit board (not shown) and are attached to pads 405 and 406 to which the leads are joined, and then, in turn, attached to the surrounding circuit board. A multiplex readout is provided for individual readout of each thermocouple as the electronic device 101 is instructed to operate under varying load profiles.

In one embodiment of the present invention, FIG. 4 shows as a heat sink a Cu-block. In accordance with FIG. 2, an electrical insulating layer is formed directly on the Cu-block. On the electrical insulating layer (on the order of about 500 to 10000 Angstrom thick) the circuitry is patterned using photolithography. Typical thermocouple junctions may consist of platinum/gold with the junctions on the order of about 10,000 microns$^2$. Again, depositions may be on the order of about 500 to 1000 Angstroms. Leads from each thermocouple may be of comparable width and thickness of the junctions but not limited to those dimensions.

Figure 5:
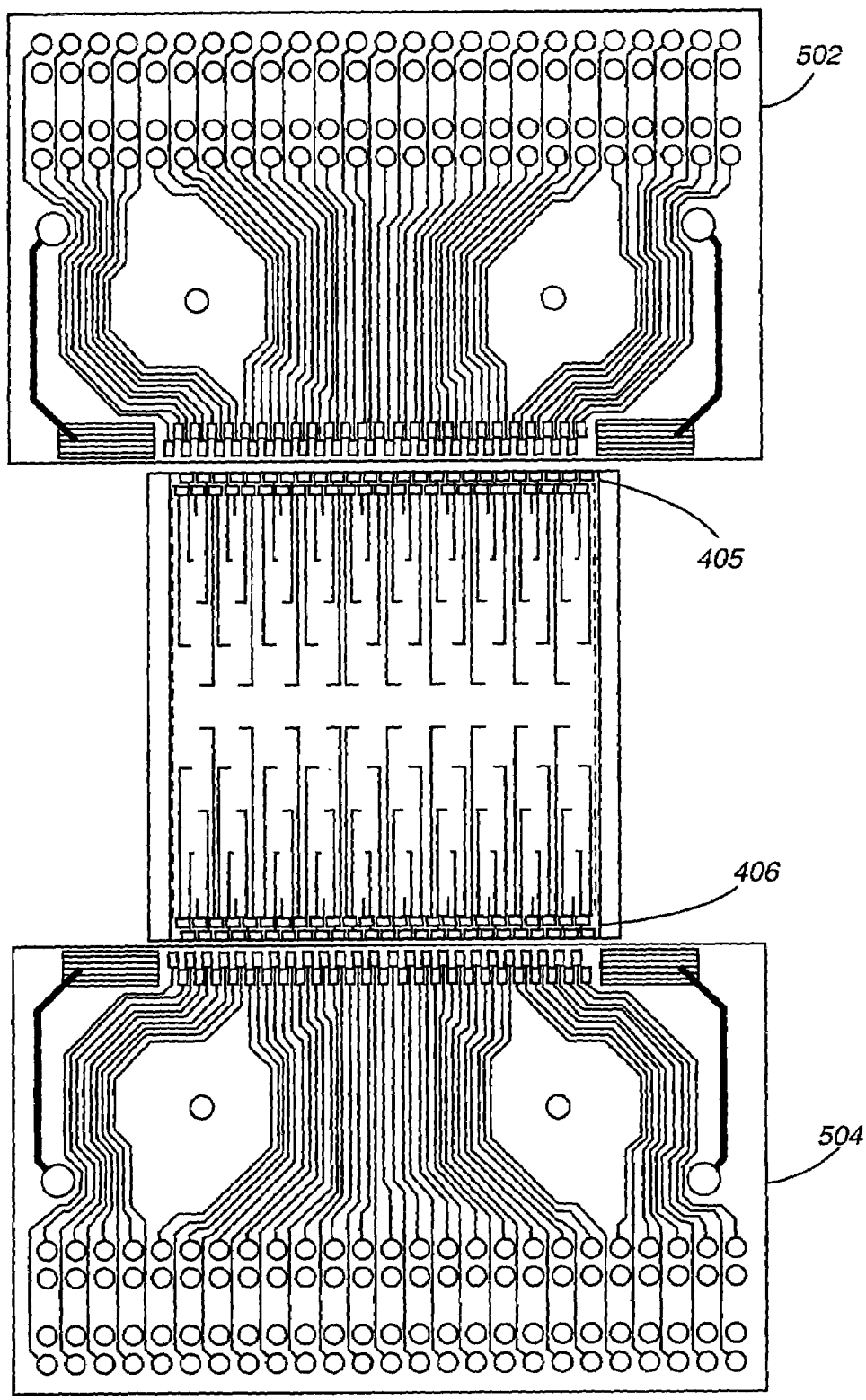
FIG. 5 is an illustration showing a circuit board for supporting thermocouple temperature sensors in an electronic device package, in one embodiment of the present invention.

FIG. 5 is an illustration showing a circuit board for supporting thermocouple thermal sensors in an electronic device package, in one embodiment of the present invention. The view of FIG. 5 is the same as FIG. 4—a view from the bottom, looking up onto the heat sink of FIG. 2. Leads from the thermocouples are directed toward a surrounding circuit board 502 and 504 and are attached to pads 405 and 406 to which the leads are joined, and then, in turn, attached to the surrounding circuit board 502 and 504.

FIG. 5 shows how wires could lead from the thermocouple circuits to the surrounding circuit board 502, 504 and to a multiplexer, which is integrated in the circuit board 502, 504. It is important to implement leads consisting of materials that do not generate stray thermocouple junctions. In one example, platinum and gold leads can be used. In this example, the connection between a gold pad 405 or 406 on the copper heat sink 202 and the circuit board 502, 504 can be realized by gold wire bonding. Platinum pad 405 or 406 would be connected with a platinum wire. Generally in order to avoid stray thermocouple signals from the surrounding circuit board 502, 504, it is recommended to control the temperature of the circuit board 502, 504. Further, the circuit board 502, 504 should be thermally isolated from the copper heat sink 202. A calibration of the copper heat sink 202 with thermocouples is undertaken prior to attachment to the operating electronic device 101.

Thin Film Resistor Temperature Sensor Embodiment

Figure 6:
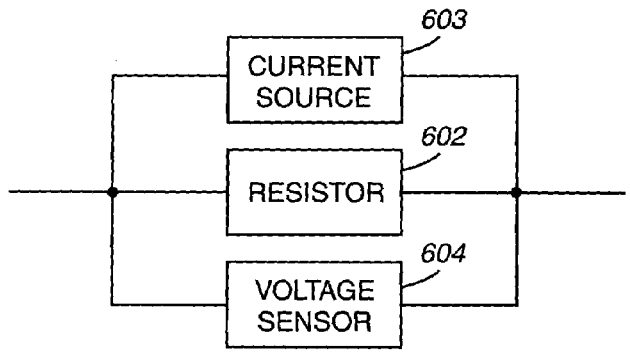
FIG. 6 is an illustration of a conventional thin film resistor temperature sensor used in another embodiment of the present invention.

FIG. 6 is an illustration of a conventional thin film resistor temperature sensor used in another embodiment of the present invention. The thin film resistor of FIG. 6 is one embodiment of a thermal sensor 210, 211 and 212 that may be used in the electronic device package of FIG. 2. FIG. 6 shows a resistor 602 connected on both sides to a voltage sensor 604 and a current source.

The electrical resistance of almost any material varies according to its temperature. Thin film resistors are made of a material such as platinum whose coefficient of resistance is well known and constant over a wide temperature range (about 20–100 C.). In most cases, resistance increases with temperature and is said to have a positive temperature coefficient (PTC). A common type of thin film resistor is a platinum resistance thermometer. We note that other resistive temperature sensors with different resistor materials can be easily implemented such as semi conducting materials, which typically have a larger temperature coefficient of resistance.

In order to elicit a temperature reading, the voltage sensor 604 takes a voltage reading of the resistor 602. A constant current is applied with the current source. The voltage is monitored across the resistor by a high impedance voltage sensor 604. The change in voltage with temperature of the resistor 602 is measured by the voltage sensor 604. The voltage changes of the resistor 602 correspond to the temperature changes.

In an embodiment of the present invention, thin film resistors are used as the thermal sensors 210, 211 and 212 of FIG. 2. In this embodiment, the distribution of thin film resistor temperature sensors in an electronic device package is identical to that shown in FIG. 4. As in FIG. 4, an array of closely spaced thin film resistors (such as the thin film resistor of FIG. 6) are distributed congruently with the top surface 103 of the electronic device 101 (note the resistors are patterned preferably on the or adjacent to the electrical insulating layer, which is directly on the heat sink). The thin film resistor array is calibrated prior to attachment to the electronic device 101.

In another embodiment of the present invention, in an area of about 2×2 cm the array of thermal sensors will consist of about 100 evenly spaced thin film resistors with junction areas on the order of about 10,000 microns$^2$. The thin film resistor circuit lines are on the order of about 1–20 microns in width. Leads from the thin film resistor are directed toward a surrounding circuit board and are attached to pads to which the leads are joined, and then, in turn, attached to the surrounding circuit board. A multiplex readout is provided for individual readout of each thin film resistor as the electronic device 101 is instructed to operate under varying load profiles.

Figure 7:
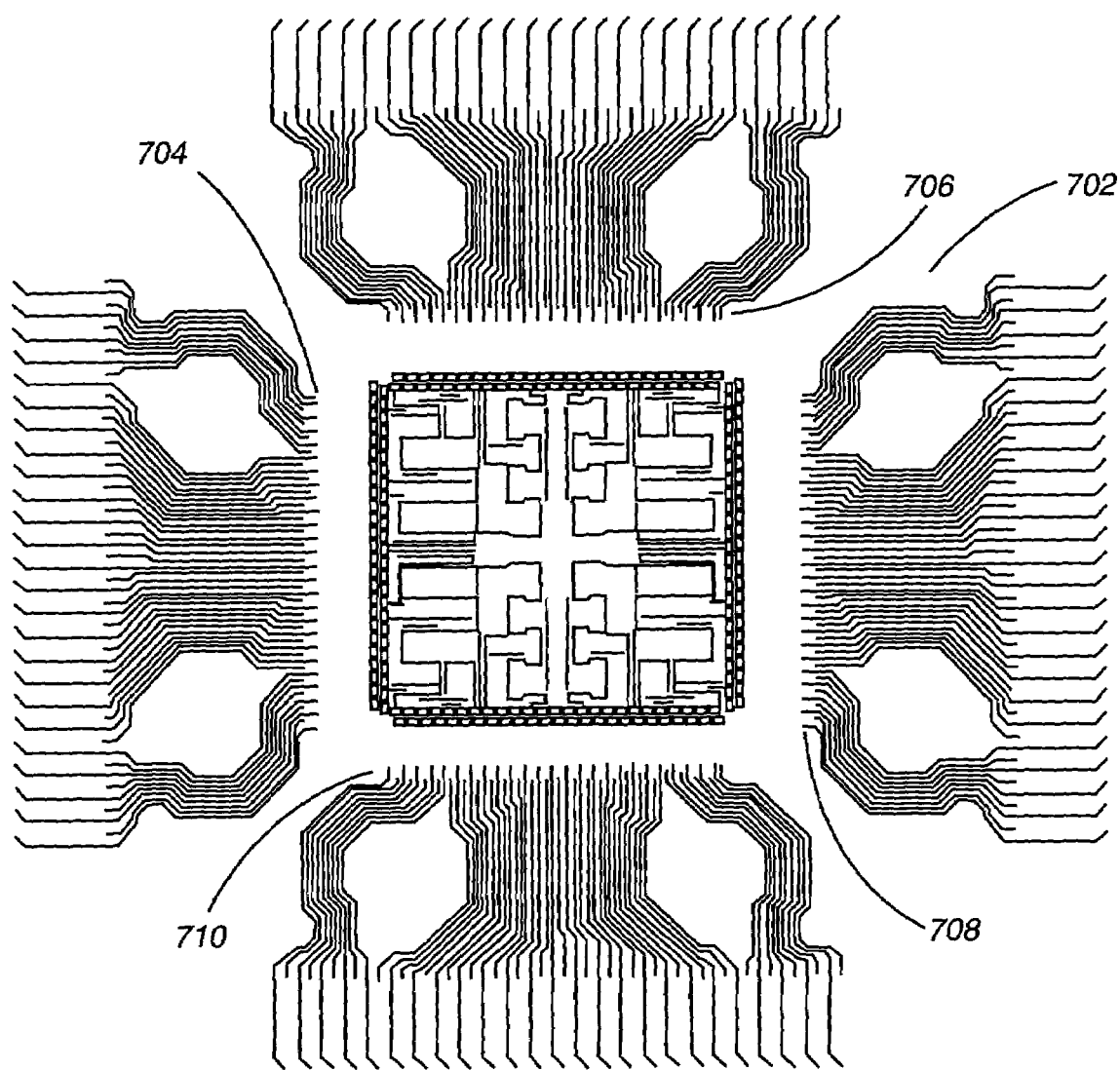
FIG. 7 is an illustration showing a circuit board for supporting thin film resistor temperature sensors in an electronic device package, in one embodiment of the present invention.

FIG. 7 is an illustration showing a circuit board for supporting thin film resistor temperature sensors in an electronic device package, in one embodiment of the present invention. The view of FIG. 7 is the same as FIG. 5—a view from the bottom, looking up onto the heat sink of FIG. 2. Leads from the thin film resistors are directed toward a surrounding circuit board 702 and are attached to pads 704, 706, 708 and 710 to which the leads are joined, and then, in turn, attached to the surrounding circuit board 702.

FIG. 7 shows how wires could lead from the thin film resistor circuits to the surrounding circuit board 702 and to a multiplexer, which is integrated in the circuit board 702. Generally in order to avoid interference with thin film resistor signals from the surrounding circuit board 702, it is recommended to control the temperature of the circuit board 702. Further, the circuit board 702 should be thermally isolated from the copper heat sink 202. A calibration of the copper heat sink 202 with the thin film resistors is undertaken prior to attachment to the operating electronic device 101. We note while in the embodiments the insulating layer is formed on the heat sink, the present invention encompasses other configurations, such as having the electrical insulating layer directly formed on the electronic device.

Photon Detector Embodiment

Figure 8:
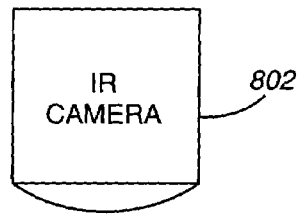
FIG. 8 is a cross sectional diagram depicting another embodiment of the present invention.
Figure 8:
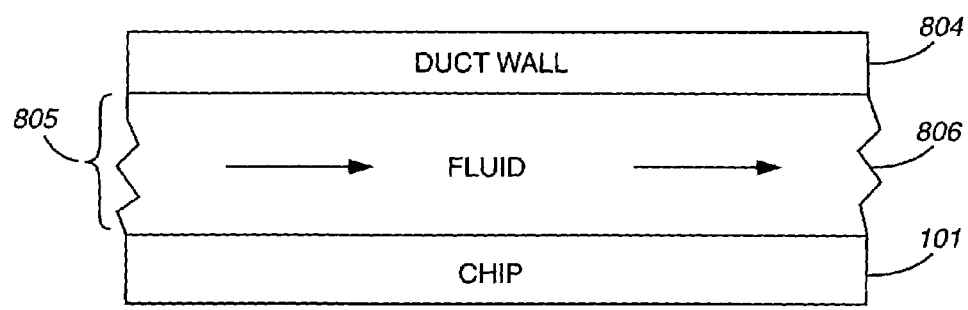

FIG. 8 is a cross sectional diagram depicting another embodiment of the present invention. FIG. 8 shows a cross section of the system of an electronic device package including a means for detecting photons, such as an infrared camera 802 and a duct 805. The photon-detector detects photons for example comprising the luminescence from the electronic device. It is important to note that although infrared detection is shown in this embodiment using a camera, other types of photon detection and photon detectors are within the true scope and spirit of the present invention. For example, in some cases it may be preferred to use thermal reflectance to monitor the temperature of the electronic device. Specifically, the photo detector detects the amount of reflected photons from the electronic device, which changes optical reflectivity with temperatures. For example, the duct 805 comprises the duct wall 804, which spans over a surface area of the top surface 103 of an electronic device 101, such as a microprocessor, microcontroller, or other semiconductor device. The bottom part of the duct 805 comprises typically the top surface 103 of the electronic device 101. In some cases, for example, a protecting thin film layer between the electronic device 101 and the fluid is preferred. Within the duct 805 is a fluid 806 that flows over the top surface 103 of the electronic device 101 in order to cool the electronic device 101. In one embodiment, the height of duct 805 is about 0.1–20 mm. Typically, it is preferred to lower the duct height in order to increase the optical transmission through the duct and fluid.

The function of illustrative infrared camera 802 is to capture thermal information of the electronic device 101 during operation of electronic device 101. More specifically, infrared camera 802 may capture thermal information of the top surface 103 of the electronic device 101 as a function of position. Thus, the infrared camera 802 captures and records thermal information and position information for each temperature reading. For example, this allows the generation of a thermal profile of the top surface 103 of the electronic device 101.

The thermal information and position information captured and recorded by infrared camera 802, i.e., the thermal distribution, would be associated with information pertaining to the operation of the electronic device 101, such as the current load profile or the current operating processes or conditions of the electronic device 101, i.e., a load profile. For example, each temperature profile would be associated with a set of processes currently running on the electronic device 101, resulting in a load-based temperature profile.

In this embodiment the duct wall 804 of the duct 805 and the fluid 806 are at least semi-transparent to infrared radiation. This allows the infrared camera 802 to gather thermal information and position information of the electronic device 101. In one embodiment of the present invention the duct wall 804 comprises polished silicon, quartz, sapphire or diamond. In another embodiment of the present invention, the fluid 806 comprises water or a cold gas. Alternatively, the fluid 806 comprises a non-polar liquid such as perflourooctane, perflouro-hexane, octane, or hexane. Fluid 806 may also comprise at least one of any alkanes and perflouroalkanes. Fluid 806 may also be transparent to infrared radiation.

In another embodiment of the present invention, alternative optical temperature sensing techniques, other than infrared camera 802, could be implemented, such as thermal reflectance, fluorescence imaging etc.

Exemplary Implementation

Figure 9:
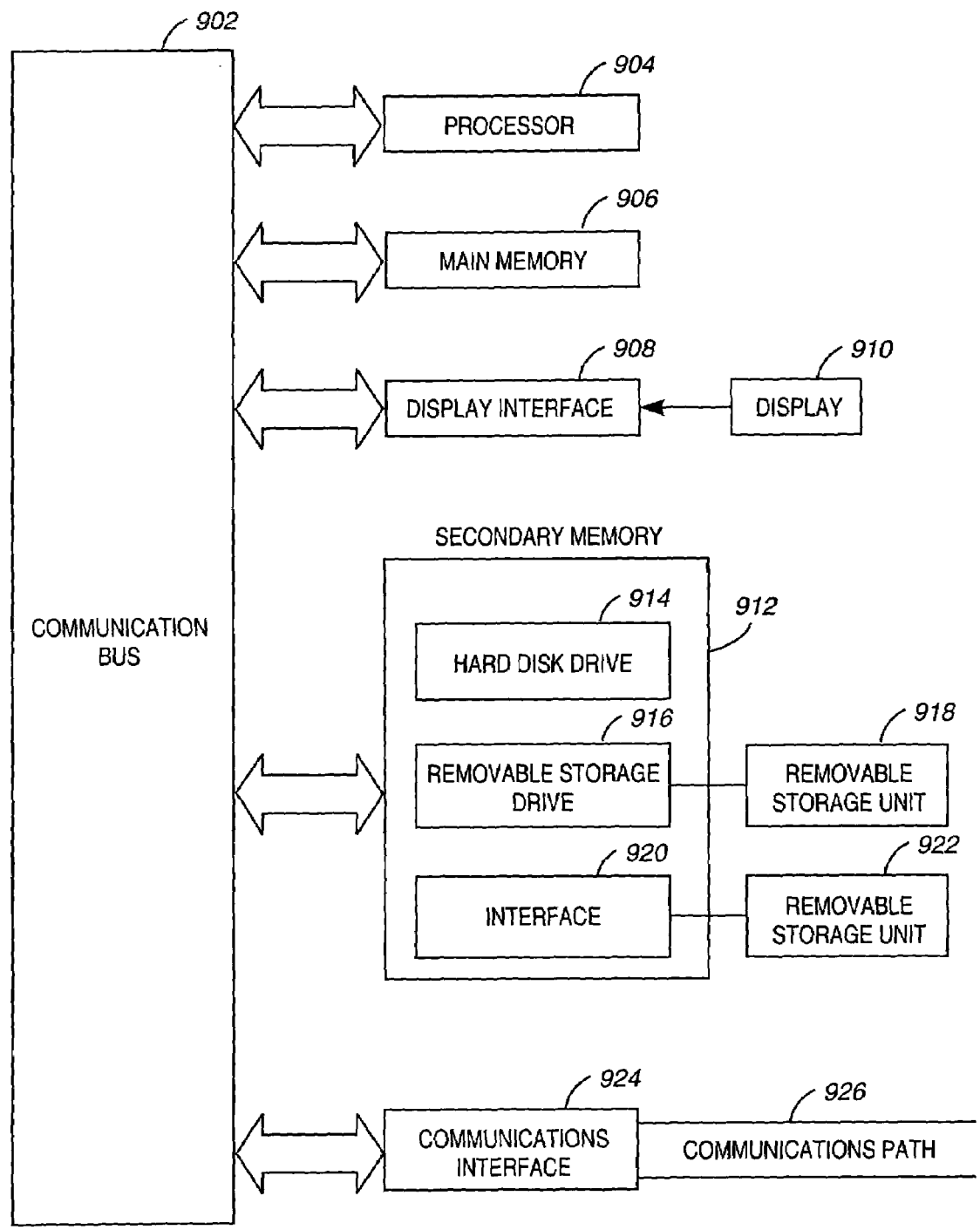
FIG. 9 is a block diagram of a computer system in which an embodiment of the present invention can be implemented.

FIG. 9 is a block diagram of a computer system in which an embodiment of the present invention can be implemented. A computer system may include, inter alia, one or more computers and at least a computer readable medium, allowing a computer system, to read data, instructions, messages or message packets, and other computer readable information from the computer readable medium. The computer system includes one or more processors, such as processor 904. The processor 904 is connected to a communication infrastructure 902 (e.g., a communications bus, cross-over bar, or network). After reading this description, it will become apparent to a person of ordinary skill in the relevant art(s) how to implement the invention in other computer systems and/or computer architectures.

The computer system can include a display interface 908 that forwards graphics, text, and other data from the communication infrastructure 902 (or from a frame buffer not shown) for display on the display unit 910. The computer system also includes a main memory 906, preferably random access memory (RAM), and may also include a secondary memory 912. The secondary memory 912 may include, for example, a hard disk drive 914 and/or a removable storage drive 916, representing a floppy disk drive, a magnetic tape drive, an optical disk drive, etc. The removable storage drive 916 reads from and/or writes to a removable storage unit 918 in a manner well known to those having ordinary skill in the art. Removable storage unit 918, represents a floppy disk, magnetic tape, optical disk, etc. which is read by and written to by removable storage drive 916. As will be appreciated, the removable storage unit 918 includes a computer usable storage medium having stored therein computer software and/or data.

In alternative embodiments, the secondary memory 912 may include other similar means for allowing computer programs or other instructions to be loaded into the computer system. Such means may include, for example, a removable storage unit 922 and an interface 920. Examples of such may include a program cartridge and cartridge interface (such as that found in video game devices), a removable memory chip (such as an EPROM, or PROM) and associated socket, and other removable storage units 922 and interfaces 920 which allow software and data to be transferred from the removable storage unit 922 to the computer system.

The computer system may also include a communications interface 924. Communications interface 924 allows software and data to be transferred between the computer system and external devices. Examples of communications interface 924 may include a modem, a network interface (such as an Ethernet card), a communications port, a PCM-CIA slot and card, etc. Software and data transferred via communications interface 924 are in the form of signals which may be, for example, electronic, electromagnetic, optical, or other signals capable of being received by communications interface 924. These signals are provided to communications interface 924 via a communications path (i.e., channel) 926. This channel 926 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 906 and secondary memory 912, removable storage drive 916, a hard disk installed in hard disk drive 914, and signals. These computer program products are means for providing software to the computer system. The computer readable medium allows the computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network, that allow a computer to read such computer readable information.

Computer programs (also called computer control logic) are stored in main memory 906 and/or secondary memory 912. Computer programs may also be received via communications interface 924. Such computer programs, when executed, enable the computer system to perform the features of the present invention as discussed herein. In particular, the computer programs, when executed, enable the processor 904 to perform the features of the computer system. Accordingly, such computer programs represent controllers of the computer system.

CONCLUSION

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

What is claimed is:

1. A system for measuring thermal distributions of an electronic device during operation, comprising:
a heat sink adapted to be coupled with an electronic device so as to be in thermal communication with the electronic device;
an electrical-insulating layer disposed between the electronic device and the heat sink; and
a plurality of thermal sensors directly patterned on the electrical-insulating layer, each of the plurality of thermal sensors in a different location, wherein the plurality of thermal sensors are located within one or more thin film circuit layers disposed on the electrical-insulating layer.

2. The system of claim 1, further comprising:
a module for receiving thermal information from the plurality of thermal sensors during operation of the electronic device, wherein the electronic device is operating under a range of operating conditions specified for the electronic device.

3. The system of claim 2, further comprising:
a processor coupled to the module for generating a thermal distribution of the electronic device based on the thermal information received from the plurality of thermal sensors.

4. The system of claim 3, wherein each of the plurality of thermal sensors is a thin film thermocouple.

5. The system of claim 4, wherein the plurality of thermal sensors comprises at least twenty five thin film thermocouples.

6. The system of claim 4, wherein each of the plurality of thermal sensors has a junction area of about 10,000 microns$^2$.

7. The system of claim 4, wherein thermal impedance of the plurality of thermal sensors is governed by the heat sink.

8. The system of claim 3, wherein the heat sink is any one of a copper element and a silicon element.

9. The system of claim 3, wherein each of the plurality of thermal sensors is a thin film resistor.

10. The system of claim 9, wherein the plurality of thermal sensors comprises at least twenty five thin film resistors.

11. The system of claim 9, wherein each of the plurality of thermal sensors has a junction area of about 10,000 microns$^2$.

12. The system of claim 9, wherein the heat sink is any one of a copper element and a silicon element.

13. The system of claim 3, wherein the electrical-insulating layer comprises a thin film of at least one of silicon nitride, silicon dioxide and alumina.

14. The system of claim 13, wherein the thin film of the electrical-insulating layer has a thickness of less than 1 micron.

15. The system of claim 3, wherein the plurality of thermal sensors comprise patterned films having a thickness from about 10 nm to about 5 microns.

16. A method for measuring thermal distributions of an electronic device during operation, the method comprising:
sensing, by a plurality of thermal sensors, thermal information of an electronic device during operation of the electronic device, the plurality of thermal sensors directly patterned on an electrical-insulating layer, each of the plurality of thermal sensors in a different location, wherein the plurality of thermal sensors are located within one or more thin film circuit layers and wherein the electrical-insulating layer is disposed between the electronic device and the heat sink.

17. The method of claim 16, further comprising:
receiving, by a module, thermal information from the plurality of thermal sensors during operation of the electronic device, wherein the electronic device is operating under a range of operating conditions specified for the electronic device.

18. The method of claim 17, further comprising:
generating a thermal distribution of the electronic device based on the thermal information received from the plurality of thermal sensors.

19. The method of claim 18, wherein each of the plurality of thermal sensors is any one of a thin film thermocouple and a thin film resistor.

20. The method of claim 18, wherein the plurality of thermal sensors comprise patterned films having a thickness from about 10 nm to 5 microns.

21. A system for measuring thermal distributions of an electronic device during operation, comprising:

an electronic device, a heat sink in thermal communication with the electronic device;

an electrical-insulating layer disposed between the electronic device and the heat sink; and a plurality of thermal sensors directly patterned on the electrical-insulating layer, each of the plurality of thermal sensors in a different location, wherein the plurality of thermal sensors are located within one or more thin film circuit layers disposed directly on the electrical-insulating layer.

* * * * *